(No Model.)  2 Sheets—Sheet 1.
T. A. EDISON.
SYSTEM OF ELECTRICAL DISTRIBUTION.
No. 339,279.  Patented Apr. 6, 1886.
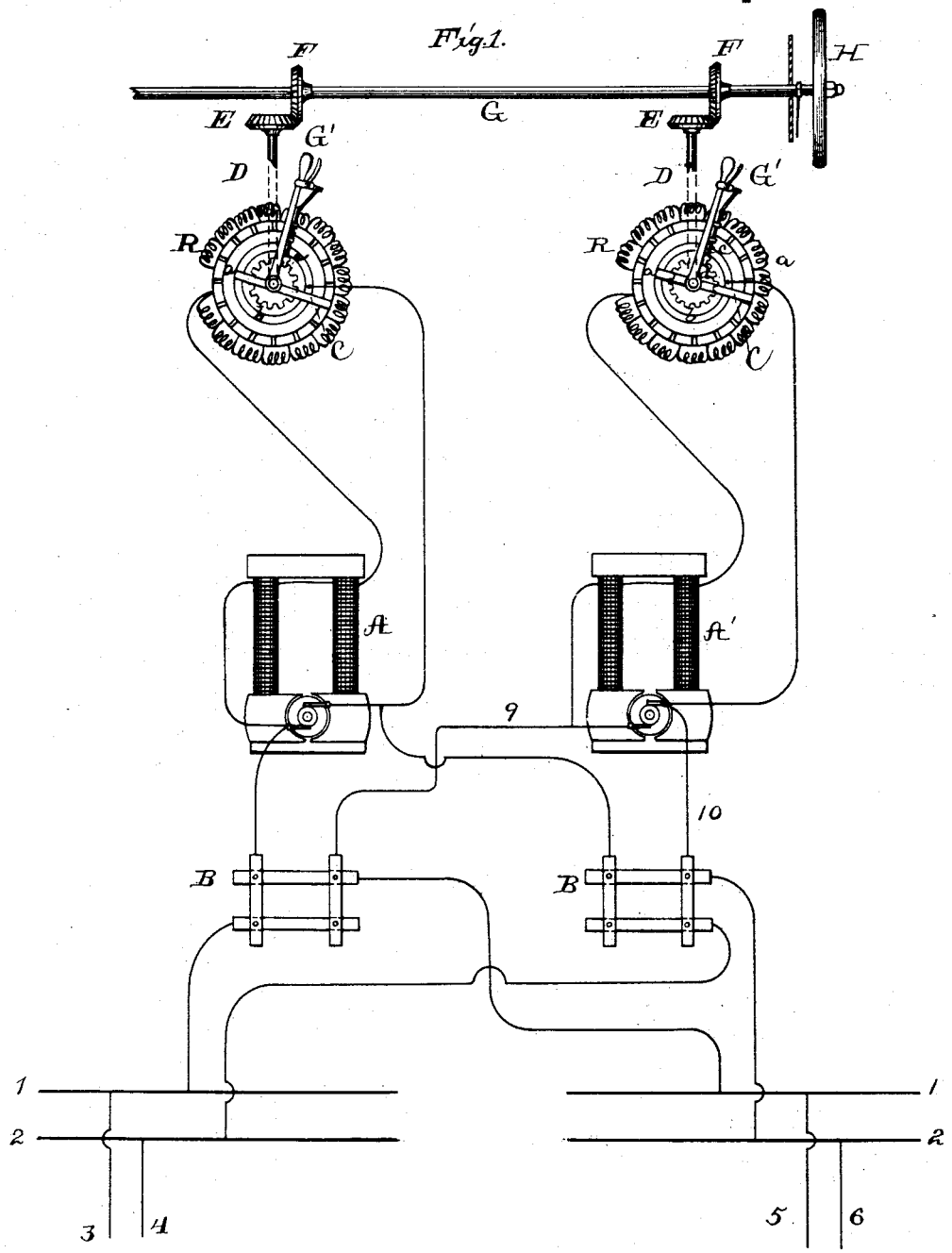

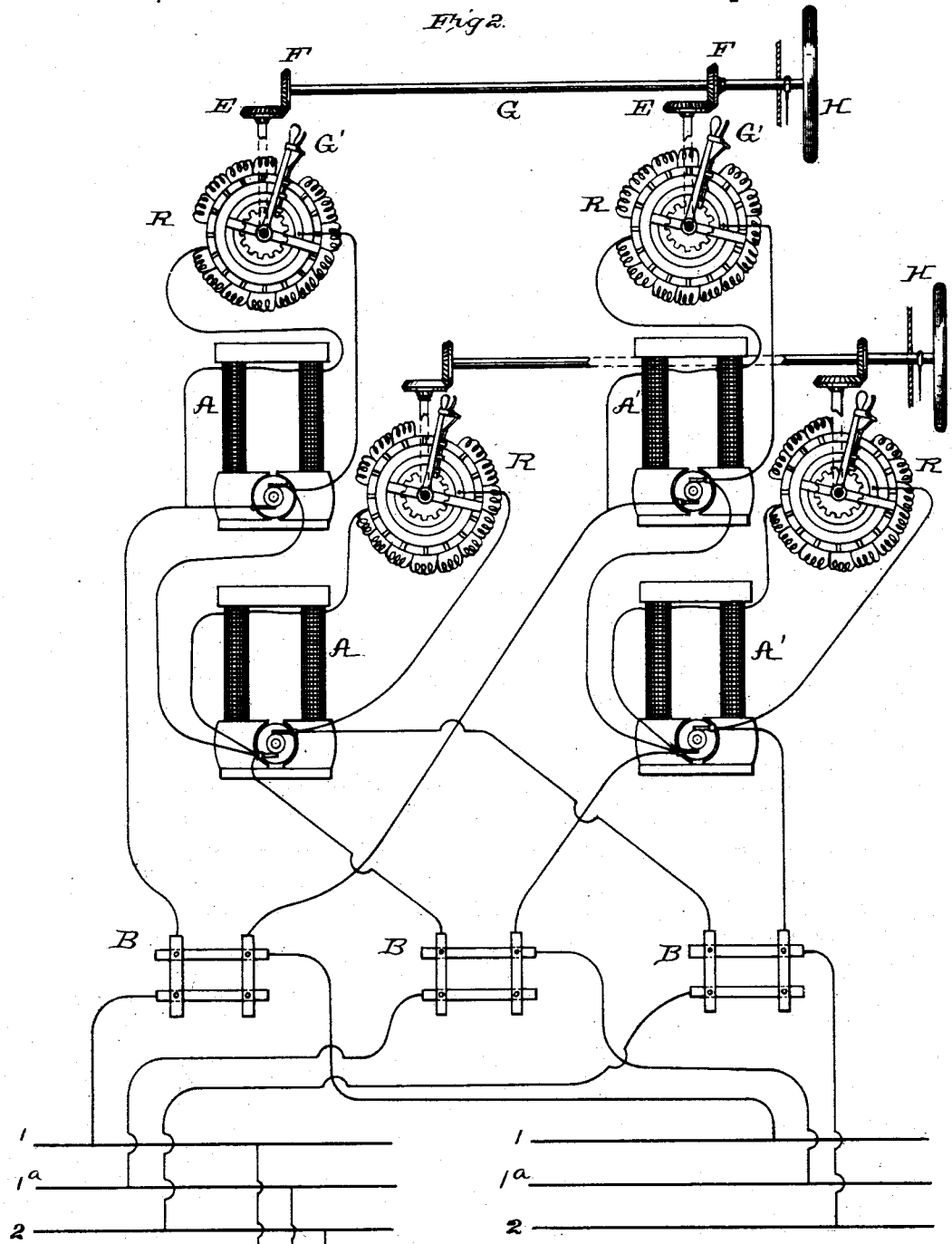

UNITED STATES PATENT OFFICE.

THOMAS A. EDISON, OF MENLO PARK, NEW JERSEY.

SYSTEM OF ELECTRICAL DISTRIBUTION.

SPECIFICATION forming part of Letters Patent No. 339,279, dated April 6, 1886.

Application filed April 5, 1884. Serial No. 126,803. (No model.)

*To all whom it may concern:*

Be it known that I, THOMAS A. EDISON, of Menlo Park, in the county of Middlesex and State of New Jersey, have invented a new and useful Improvement in Systems of Electrical Distribution, (Case No. 618,) of which the following is a specification.

This invention relates to the regulation of the current supplied to the translating devices in a system of electrical distribution, in which such devices are connected with a system of intersecting and connected main conductors, which are joined to the source of supply by feeding-circuits, and is intended as an improvement upon the method of regulation set forth in the patent granted to C. S. Bradley, No. 291,141, dated January 1, 1884. In that patent the several dynamo-electric machines or series of such machines at the central station or source of supply are connected independently with the feeding-circuits, and so arranged that any machine may be thrown into connection with any feeder, or a number of feeders may be supplied from any required number of dynamo-electric machines, each machine or series being also provided with means for regulating its electro-motive force independently of the others, whereby current may be supplied to each part of the district according to the number of translating devices there in circuit, and the "pressure" is maintained the same at all parts of the district, all the translating devices receiving the same current. Thus, if the number of translating devices in any part of the system is increased, the electro-motive force of the generator or generators connected to the feeder which terminates nearest to such point is increased; or, if the increase is very great, one or more additional generators are attached to such feeder.

My improvement upon this system consists in providing means whereby all the generators in circuit can be regulated simultaneously, in addition to their independent regulation, so that the current in all the feeders, and therefore that supplied to all the translating devices in the district, can be raised and lowered at the same time. I prefer to use for this purpose the apparatus set forth in my Patent No. 281,349, dated July 17, 1883, with an additional device which allows the regulator-arms to be readily adjusted independently.

My invention is illustrated in the annexed drawings, in which Figure 1 is a diagram illustrating its application to an ordinary multiple-arc system, while Fig. 2 shows it in connection with my three-wire or compensating system.

Referring first to Fig. 1, A A' are dynamo-electric machines, and 1 2 are the common conductors at the central station, from which extend the feeding-circuits 3 4 and 5 6. These, it is understood, are connected at different points to the system of intersecting and properly connected positive and negative main conductors, on which the lamps, motors, or other translating devices are arranged in multiple arc. The generators are connected in multiple arc to the conductors through the switch-boards B B, which are so connected that each generator may, by the insertion of the proper plugs connecting intersecting bars, be connected with either feeding-circuit or either generator to both feeders, or both feeders to a single generator.

In the field-circuit of each machine is a resistance, R, adjustable by means of the arm C, in contact with plates $a$ and metal ring $b$, so that by turning the arm more or less of the resistance-coils are thrown into circuit. From each arm C a spindle, D, (which for convenience of illustration is shown partly in dotted lines,) extends to a bevel-wheel, E. These bevel-wheels engage with corresponding bevel-wheels, F, on the shaft G, which is provided with a hand-wheel, H, for turning it. By turning the shaft all the resistances are adjusted simultaneously and to the same extent. Each resistance is also provided with means for moving the adjusting-arm independently of the common shaft. Such means consist of the arm G', which is locked at the position to which it is adjusted by the catch $c$ and ratchet $d$.

The generators are respectively connected to the feeders, and their electro-motive force adjusted by separately regulating their field-resistances until each feeder receives the right proportion of current. Then, in order to regulate the current to all the feeders and all the translating devices in the district, the resistances are all adjusted simultaneously.

In Fig. 2 an additional compensating-conductor, 1ª, is employed in each circuit.

The generators are connected in series of two each, A A and A' A'. A system of this character is set forth in my Patent No. 274,290, dated March 20, 1883. The switchboard connections are made for each series the same as for the single machines of Fig. 1, one or more series being connected to each feeder, as desired.

To regulate the electro-motive force of one series, the resistance in the field-circuit of one machine or those of both machines of that series are adjusted, while by adjusting both resistances of one of the connected sets of resistances, or, if necessary, of both such connected sets, the regulation of both series is effected.

It is evident that each series of generators in Fig. 2 is the equivalent of a single generator of Fig. 1.

What I claim is—

1. The combination, in a system of electrical distribution, of two or more feeding-circuits for supplying current to the translating devices, two or more independent generators, means for connecting said generators separately with said feeders, means for separately regulating each generator, and means for simultaneously regulating all said generators, substantially as set forth.

2. In a system of electrical distribution, the combination of the two or more feeding-circuits supplying current to different parts of the district, two or more independent generators, means for connecting each generator separately with the feeders, an adjustable resistance in the field-circuit of each generator, means for adjusting each resistance separately, and means for adjusting all said resistances simultaneously, substantially as set forth.

3. The combination of two or more dynamo-electric machines, an adjustable resistance in the field-circuit of each machine, means for adjusting all said resistances simultaneously, and means for adjusting each resistance separately, substantially as set forth.

This specification signed and witnessed this 8th day of February, 1884.

THOS. A. EDISON.

Witnesses:
A. W. KIDDLE,
E. C. ROWLAND.